(12) United States Patent
Wei (10) Patent No.: US 10,297,838 B2
(45) Date of Patent: May 21, 2019

(54) METHOD OF FORMING A GRAPHENE OXIDE-REDUCED GRAPHENE OXIDE JUNCTION

(71) Applicant: Nokia Technologies Oy, Espoo (FI)

(72) Inventor: Di Wei, Cambridge (GB)

(73) Assignee: Nokia Technologies Oy, Espoo (FI)

(*) Notice: Subject to any disclaimer, the term of this patent is extended or adjusted under 35 U.S.C. 154(b) by 166 days.

(21) Appl. No.: 15/521,759

(22) PCT Filed: Oct. 8, 2015

(86) PCT No.: PCT/FI2015/050672
§ 371 (c)(1),
(2) Date: Apr. 25, 2017

(87) PCT Pub. No.: WO2016/066886
PCT Pub. Date: May 6, 2016

(65) Prior Publication Data
US 2017/0237081 A1    Aug. 17, 2017

(30) Foreign Application Priority Data
Oct. 30, 2014    (EP) .................................... 14191063

(51) Int. Cl.
| | | |
|---|---|---|
| *H01M 6/32* | (2006.01) | |
| *H01M 4/06* | (2006.01) | |
| *H01M 4/133* | (2010.01) | |
| *H01M 4/36* | (2006.01) | |
| *H01M 4/583* | (2010.01) | |
| *H01M 6/04* | (2006.01) | |

(Continued)

(52) U.S. Cl.
CPC ............... *H01M 6/32* (2013.01); *H01M 4/06* (2013.01); *H01M 4/133* (2013.01); *H01M 4/364* (2013.01); *H01M 4/583* (2013.01); *H01M 6/045* (2013.01); *H01M 6/181* (2013.01); *H01M 6/40* (2013.01); *H01M 2220/30* (2013.01); *H01M 2300/0045* (2013.01); *H01M 2300/0085* (2013.01)

(58) Field of Classification Search
CPC ........ H01M 4/133; H01M 4/583; H01M 6/32; H01M 6/40
USPC ....................................... 429/231.8
See application file for complete search history.

(56) References Cited

U.S. PATENT DOCUMENTS

| | | | |
|---|---|---|---|
| 2012/0170171 A1 | 7/2012 | Lee et al. ...................... 361/502 |
| 2014/0120453 A1* | 5/2014 | Ajayan ................... C01B 32/23 |
| | | | 429/482 |

FOREIGN PATENT DOCUMENTS

WO    WO 2009/134707 A2    11/2009

* cited by examiner

*Primary Examiner* — James M Erwin
(74) *Attorney, Agent, or Firm* — Harrington & Smith (57) ABSTRACT

An apparatus including a first electrode including a substantially homogeneous mixture of graphene oxide and a proton conductor; a second electrode including reduced graphene oxide; and spaced-apart charge collectors for the respective first and second electrodes, wherein the first and second electrodes extend from their respective charge collectors towards one another to form a junction at an interface there between, and wherein the substantially homogeneous mixture of the first electrode is configured to be sufficiently hydrophobic to prevent intermixing of the homogeneous mixture with the reduced graphene oxide of the second electrode in proximity to one or both of the respective charge collectors to prevent short circuiting of the spaced-apart charge collectors.

20 Claims, 3 Drawing Sheets

(51) Int. Cl.
*H01M 6/18* (2006.01)
*H01M 6/40* (2006.01)

METHOD OF FORMING A GRAPHENE OXIDE-REDUCED GRAPHENE OXIDE JUNCTION

TECHNICAL FIELD

The present disclosure relates to the use of graphene oxide, associated methods and apparatus, and in particular concerns a substantially homogeneous mixture of graphene oxide and a proton conductor for use as a first electrode of an apparatus. One specific application of the substantially homogeneous mixture is the production of proton batteries, which may form part of an electronic device or module. In this respect, certain disclosed example aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs), smartwatches and tablet PCs.

The portable electronic devices/apparatus according to one or more disclosed example aspects/embodiments may provide one or more audio/text/video communication functions (e.g. tele-communication, video-communication, and/or text transmission, Short Message Service (SMS)/Multimedia Message Service (MMS)/emailing functions, interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

Research is currently being done to develop smaller electrical storage cells having a greater storage density than existing storage cells for use in modern electronic devices.

The listing or discussion of a prior-published document or any background in this specification should not necessarily be taken as an acknowledgement that the document or background is part of the state of the art or is common general knowledge.

SUMMARY

According to a first aspect, there is provided an apparatus comprising:
a first electrode comprising a substantially homogeneous mixture of graphene oxide and a proton conductor;
a second electrode comprising reduced graphene oxide; and
spaced-apart charge collectors for the respective first and second electrodes,
wherein the first and second electrodes extend from their respective charge collectors towards one another to form a junction at an interface therebetween, and
wherein the substantially homogeneous mixture of the first electrode is configured to be sufficiently hydrophobic to prevent intermixing of the homogeneous mixture with the reduced graphene oxide of the second electrode in proximity to one or both of the respective charge collectors to prevent short circuiting of the spaced-apart charge collectors.

The substantially homogeneous mixture may comprise a substantially uniform distribution of graphene oxide and proton conductor throughout the volume of the mixture.

The substantially homogeneous mixture may comprise a ratio of graphene oxide to proton conductor of 1:9, 1:4, 3:7, 2:3, 1:1, 3:2, 7:3, 4:1 or 9:1.

The substantially homogeneous mixture may comprise one or more of a solution, a suspension, a colloid and a dispersion.

The proton conductor, per se, may be sufficiently hydrophobic to prevent intermixing of the homogeneous mixture with the reduced graphene oxide of the second electrode in proximity to one or both of the respective charge collectors to prevent short circuiting of the spaced-apart charge collectors.

The proton conductor may comprise one or more of an organic polymer, an ionomer and Nafion™.

The apparatus may be configured to generate protons at the junction between the first and second electrodes in the presence of water, and the apparatus may comprise an electrolyte configured to facilitate the flow of generated protons between the first and second electrodes.

The electrolyte may be configured to absorb water from the surrounding environment and deliver it to the junction to facilitate the generation of protons.

The electrolyte may comprise one or more of a room-temperature ionic liquid and an ion gel.

The room-temperature ionic liquid may comprise one or more of triethylsulfonium bis(trifluoromethylsulfonyl)imide ([SET3][TFSI]), 1-butyl-3-methyl-imidazolium ([BMIM][CI]), and trioctylmethylammonium bis(trifluoromethylsulfonyl)imide ([OMA][TFSI]).

The apparatus may comprise a substrate configured to support the first electrode, second electrode and respective charge collectors.

The substrate may comprise one or more of paper and a polymer.

The apparatus may comprise a paper substrate configured to support the first electrode, second electrode and respective charge collectors, and the electrolyte may be soaked into the paper substrate.

The respective charge collectors may be spaced apart by a distance of less than one or more of 2 mm, 1 mm, 500 µm, 100 µm and 50 µm.

The width of the junction between the first and second electrodes may be less than one or more of 500 µm, 100 µm, 50 µm, 10 µm and 1 µm.

The respective charge collectors may comprise one or more of a metal, an alloy, gold, silver and copper.

The apparatus may be one or more of an electronic device, a portable electronic device, a portable telecommunications device, a mobile phone, a tablet, a phablet, a personal digital assistant, a laptop computer, a desktop computer, a smartphone, a smartwatch, smart eyewear, a proton battery, a humidity sensor, and a module for one or more of the same.

According to a further aspect, there is provided a substantially homogeneous mixture of graphene oxide and a proton conductor for use as a first electrode of an apparatus, the apparatus comprising
the first electrode,
a second electrode comprising reduced graphene oxide; and
spaced apart charge collectors for the respective first and second electrodes,
wherein the first and second electrodes extend from their respective charge collectors towards one another to form a junction at an interface therebetween, and
wherein the substantially homogeneous mixture of the first electrode is configured to be sufficiently hydrophobic to prevent intermixing of the homogeneous mixture with the reduced graphene oxide of the second electrode in proximity to one or both of the respective charge collectors to prevent short circuiting of the spaced apart charge collectors.

According to a further aspect, there is provided use of a substantially homogeneous mixture of graphene oxide and a proton conductor as a first electrode of an apparatus, the apparatus comprising the first electrode, a second electrode comprising reduced graphene oxide; and spaced apart charge collectors for the respective first and second electrodes, wherein the first and second electrodes extend from their respective charge collectors towards one another to form a junction at an interface therebetween, and wherein the substantially homogeneous mixture of the first electrode is sufficiently hydrophobic to prevent intermixing of the homogeneous mixture with the reduced graphene oxide of the second electrode in proximity to one or both of the respective charge collectors to prevent short circuiting of the spaced apart charge collectors.

According to a further aspect, there is provided a method comprising:

mixing graphene oxide with a proton conductor to form a substantially homogeneous mixture for use as a first electrode of an apparatus, the apparatus comprising the first electrode, a second electrode comprising reduced graphene oxide; and spaced apart charge collectors for the respective first and second electrodes, wherein the first and second electrodes extend from their respective charge collectors towards one another to form a junction at an interface therebetween, and wherein the substantially homogeneous mixture of the first electrode is configured to be sufficiently hydrophobic to prevent intermixing of the homogeneous mixture with the reduced graphene oxide of the second electrode in proximity to one or both of the respective charge collectors to prevent short circuiting of the spaced apart charge collectors.

Mixing graphene oxide with a proton conductor to form a substantially homogeneous mixture may comprise mixing an aqueous solution of graphene oxide with a proton conductor at a ratio of 1:9, 1:4, 3:7, 2:3, 1:1, 3:2, 7:3, 4:1 or 9:1.

The method may comprise mixing an aqueous solution of graphene oxide with potassium hydroxide to form reduced graphene oxide for use as the second electrode of the apparatus.

According to a further aspect, there is provided a method comprising:

depositing first and second electrodes for use with respective spaced-apart charge collectors, the first electrode comprising a substantially homogeneous mixture of graphene oxide and a proton conductor, the second electrode comprising reduced graphene oxide, wherein the first and second electrodes are deposited to extend from their respective charge collectors towards one another to form a junction at an interface therebetween, and wherein the substantially homogeneous mixture of the first electrode is configured to be sufficiently hydrophobic to prevent intermixing of the homogeneous mixture with the reduced graphene oxide of the second electrode in proximity to one or both of the respective charge collectors to prevent short circuiting of the spaced-apart charge collectors.

The steps of any method disclosed herein do not have to be performed in the exact order disclosed, unless explicitly stated or understood by the skilled person.

Corresponding computer programs for implementing one or more steps of the methods disclosed herein are also within the present disclosure and are encompassed by one or more of the described example embodiments.

One or more of the computer programs may, when run on a computer, cause the computer to configure any apparatus, including a battery, circuit, controller, or device disclosed herein or perform any method disclosed herein. One or more of the computer programs may be software implementations, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be a manufacture or assembly program.

One or more of the computer programs may be provided on a computer readable medium, which may be a physical computer readable medium such as a disc or a memory device, or may be embodied as a transient signal. Such a transient signal may be a network download, including an internet download.

The present disclosure includes one or more corresponding aspects, example embodiments or features in isolation or in various combinations whether or not specifically stated (including claimed) in that combination or in isolation. Corresponding means for performing one or more of the discussed functions are also within the present disclosure.

The above summary is intended to be merely exemplary and non-limiting.

BRIEF DESCRIPTION OF THE FIGURES

A description is now given, by way of example only, with reference to the accompanying drawings, in which.

DESCRIPTION OF SPECIFIC ASPECTS/EMBODIMENTS

Electrical energy storage is an important consideration for portable electronic devices. Proton batteries are currently being developed for this purpose. The energy generation mechanism of one type of proton battery involves the degradation of a graphene oxide-reduced graphene oxide junction when in contact with water. The water may be contained within the battery or it may come from the surrounding environment (e.g. in the form of air humidity).

Figure 1A:
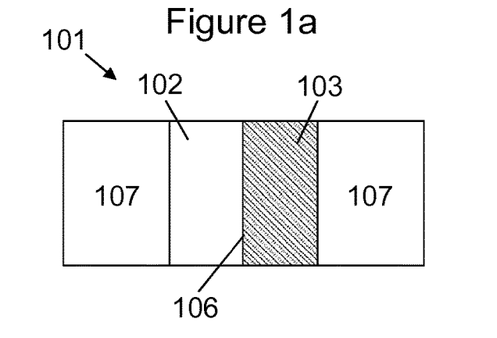
FIG. 1a illustrates schematically one example of a printed proton battery in plan-view.
Figure 1B:
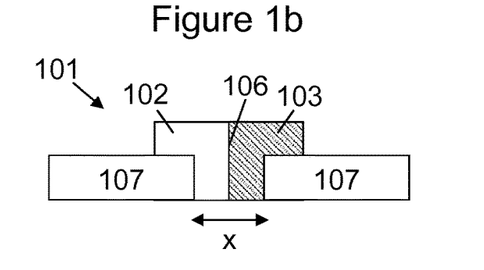
FIG. 1b illustrates schematically the printed proton battery of FIG. 1a in cross-section.

FIGS. 1a and 1b show one example of a printed graphene oxide-based proton battery 101 in plan view and cross-section, respectively. The battery 101 comprises a first electrode 102 formed from graphene oxide and a second electrode 103 formed from reduced graphene oxide. The first 102 and second 103 electrodes are deposited such that they (at least partly) overlie respective charge collectors 107 and form a junction 106 with one another at an interface therebetween. To avoid short circuiting the device, the first 102 and second 103 electrode materials should not be in contact with the charge collector 107 of the opposite electrode. In order to achieve this, the charge collectors 107 are separated from one another by a predetermined distance "x" (typically no less than 2 mm), which is dictated by the printing resolution of the deposition tool used to print the graphene oxide 102 and reduced graphene oxide 103, and the fluidity of the graphene oxide inks used to form the active electrode materials 102, 103. The need for this relatively large electrode spacing increases the footprint of the apparatus 101 and thus reduces its electrical storage density.

There will now be described an apparatus and associated methods that may provide a solution to this issue.

Figure 2:
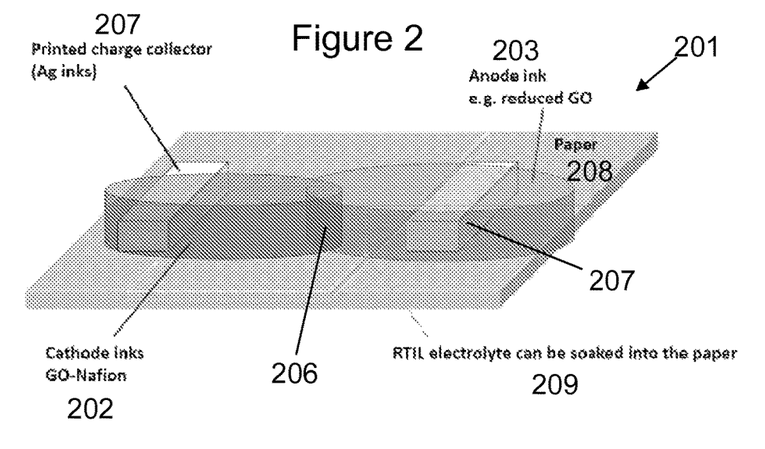
FIG. 2 illustrates schematically one example of the present apparatus (perspective view)

FIG. 2 shows one example of the present apparatus 201, which may be one or more of a proton battery, a humidity sensor and a module for the same. The apparatus 201 comprises a first electrode 202, a second electrode 203 and spaced-apart charge collectors 207 for the respective first 202 and second 203 electrodes, which are supported on a substrate 208. As per the proton battery 101 shown in FIG. 1, the first electrode 202 comprises graphene oxide and the second electrode 203 comprises reduced graphene oxide. In addition, the first 202 and second 203 electrodes extend from their respective charge collectors 207 towards one another to form a junction 206 at an interface therebetween. Unlike the proton battery 101 of FIG. 1, however, the first electrode 202 of the present apparatus 201 comprises a substantially homogeneous mixture of graphene oxide and a proton conductor, which is configured to be sufficiently hydrophobic to prevent intermixing of the homogeneous mixture with the (hydrophilic) reduced graphene oxide of the second electrode 203 in proximity to one or both of the respective charge collectors 207. In this way, neither the first 202 nor second 203 electrode materials are in contact with both charge collectors 207, which helps to prevent short circuiting of the spaced-apart charge collectors 207. The proton conductor may be one or more of an organic polymer and an ionomer, a suitable example of which is Nafion™. In addition, the charge collectors 207 may be formed from one or more of a metal, an alloy, gold, silver and copper.

The ability to limit intermixing of the electrode materials 202, 203 enables the respective charge collectors 207 to be positioned closer together to reduce the size, and increase the electrical storage density, of the apparatus 201. In this respect, the respective charge collectors 207 of the present apparatus 201 may be spaced apart by a distance of less than one or more of 2 mm, 1 mm, 500 µm, 100 µm and 50 µm. A minimum separation distance of 5 µm or 10 µm may be achievable. Furthermore, the width of the junction 206 formed by the first 202 and second 203 electrodes may be less than one or more of 500 µm, 100 µm, 50 µm, 10 µm and 1 µm.

The expression "substantially homogeneous" used herein with respect to the mixture of graphene oxide and proton conductor may be taken to mean that the mixture comprises a substantially uniform distribution of graphene oxide and proton conductor throughout the volume of the mixture, and in some cases, may be without phase separation. For example, the substantially uniform distribution may comprise one or more of a substantially regular spacing between adjacent graphene oxide flakes, and a substantial non-clustering of graphene oxide flakes. Also, this substantially uniform distribution/non-clustering of graphene oxide flakes may apply to at least 50%, 55%, 60%, 65%, 70%, 75%, 80%, 85%, 90%, 95% or 98% of the graphene oxide flakes, and may require that one or more of the difference in concentration (average number of particles per unit area/volume) and spacing of graphene oxide flakes between difference regions of the mixture is no more than 2%, 5%, 10%, 20%, 30%, 40% or 50%. These percentages are, of course, subject to the operational tolerances of the measurement tool (e.g. +/−5% or 10%).

In practice, the substantially homogenous mixture may comprise a ratio of graphene oxide to proton conductor of 1:9, 1:4, 3:7, 2:3, 1:1, 3:2, 7:3, 4:1 or 9:1, and it may take the form of one or more of a solution, a suspension, a colloid and a dispersion. In some cases, the proton conductor may itself be sufficiently hydrophobic to prevent intermixing of the homogeneous mixture with the reduced graphene oxide, whilst in other cases, it may be the combination of the proton conductor with the graphene oxide which provides said hydrophobicity. In the former scenario, the hydrophobicity of the mixture will increase with the percentage of proton conductor. Whilst this reduces the intermixing of the respective electrode materials 202, 203 and thus provides greater control of the electrode materials 202, 203 during fabrication, it also reduces the percentage of graphene oxide in the first electrode 202 which reduces the number of generated protons.

The apparatus 201 is configured to generate protons at the junction 206 of the first 202 and second 203 electrodes in the presence of water, which gives rise to a potential difference between their respective charge collectors 207. The potential difference produced by the generation of protons may be used to power an external circuit (i.e. apparatus 201 is operating as a proton battery), or it may be used in the detection and/or quantification of water in the surrounding environment (i.e. apparatus 201 is operating as a humidity sensor).

In order to produce and utilise the potential difference, the generated protons should be able to travel between the first 202 and second 203 electrodes. The ionic conductivity of the proton conductor at the first electrode 202 facilitates this flow of protons. In some cases, however, the apparatus 201 may also comprise an electrolyte 209 configured to facilitate the flow of generated protons between the first 202 and second 203 electrodes. As shown in FIG. 2, the apparatus 201 may comprise a paper substrate 208 configured to support the electrodes 202, 203 and respective charge collectors 207, and the electrolyte 209 may be soaked into the paper substrate 208. The use of a paper substrate 208 can reduce the fabrication costs and enable thinner (e.g. "two-dimensional") devices 201 to be produced. Polymers may also be used to form the supporting substrate 208.

In some examples, the electrolyte 209 may be configured to absorb water from the surrounding environment and deliver it to the junction 206 to facilitate the generation of protons. This can be achieved by using electrolytes which are hydrophilic as well as ionically conducting. Such electrolytes include room-temperature ionic liquids and ion gels, examples of which include [SET3][TFSI], [BMIM][CI] and [OMA][TFSI].

Figure 3A:
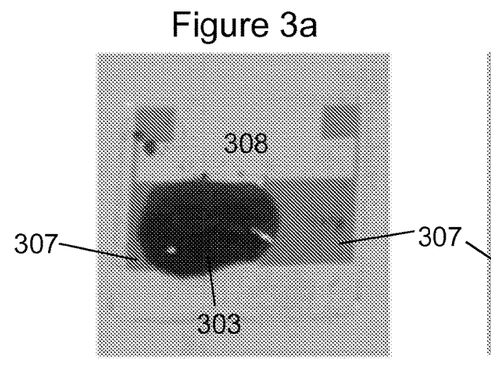
FIG. 3a illustrates photographically (in plan-view) one example of a reduced graphene oxide ink spreading from the charge collector of one electrode to the charge collector of the other electrode.
Figure 3B:
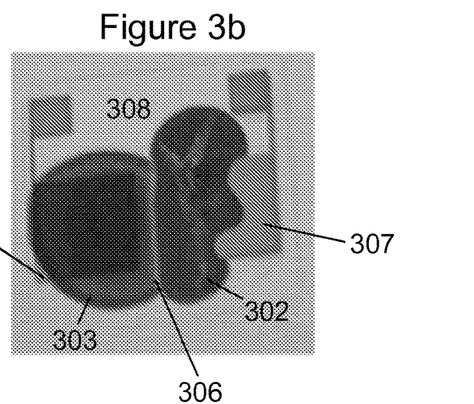
FIG. 3b illustrates photographically (in plan-view) one example of the use of a substantially homogeneous mixture of graphene oxide and a proton conductor to limit spreading of the reduced graphene oxide ink.

FIGS. 3a-3b are example photographs showing the formation of a graphene oxide-reduced graphene oxide junction 306 using a substantially homogeneous mixture 302 of graphene oxide and proton conductor at one side of the junction 306, and an aqueous solution of reduced graphene oxide 303 at the other side of the junction 306. In this example, the substantially homogeneous mixture 302 was formed by mixing an aqueous solution of graphene oxide with Nafion™ at a ratio of 1:1, and the reduced graphene oxide solution 303 was formed by mixing an aqueous solution of graphene oxide with potassium hydroxide. The electrode materials 302, 303 were then printed onto respective charge collectors 307, which were themselves formed by evaporating silver onto a polymer substrate 308 with a spacing of 2 mm.

As can be seen in FIG. 3a, the reduced graphene oxide solution 303 spread into the opposing charge collector region 307 after deposition. When the graphene oxide-proton conductor mixture 302 was deposited onto its respective charge collector 307, however, the hydrophobic interaction between the electrode materials 302, 303 repelled the reduced graphene oxide solution 303 back into the 2 mm gap. The resulting graphene oxide-reduced graphene oxide junction 306 can be seen as a pale line between the respective charge collectors 307.

Figure 3C:
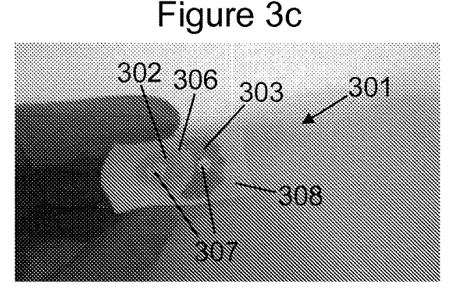
FIG. 3c illustrates photographically (in plan-view) one example of the use of a paper substrate to support the electrodes and respective charge collectors of the present apparatus.

FIG. 3c is an example photograph showing an apparatus 301 comprising a graphene oxide-reduced graphene oxide junction 306 formed on top of a paper substrate 308. The electrode 302, 303 and charge collector 307 materials are as described with respect to FIGS. 3a-3b. It is typically more difficult to fabricate a working device 301 of this type on paper 308 due to the relatively high absorption of reduced graphene oxide solution 303 which soaks through the paper 308 to the charge collector 307 of the opposing electrode 302 resulting in a short circuit. The ability to fabricate the apparatus 301 shown here is down to the hydrophobicity of the substantially homogeneous mixture 302 used to form the first electrode, which repels the hydrophilic reduced graphene oxide solution 303 used to form the second electrode. As can be seen in the photograph of FIG. 3c, the repulsion of the electrode materials 302, 303 creates a well-defined junction 306 (visible as a pale line) where the two absorbed fluids 302, 303 meet on the paper 308.

Figure 4:
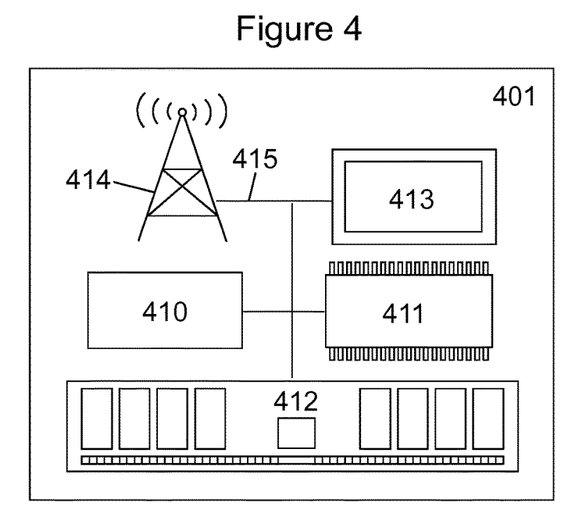
FIG. 4 illustrates schematically another example of the present apparatus.

FIG. 4 shows another example of the present apparatus 401. In this example, the apparatus 401 comprises the first electrode, second electrode and respective charge collectors described previously (shown in FIG. 4 as device 410), a processor 411, a storage medium 412, an electronic display 413 and a transceiver 414, which are electrically connected to one another by a data bus 415. The apparatus 401 may be one or more of an electronic device, a portable electronic device, a portable telecommunications device, a mobile phone, a personal digital assistant, a tablet, a phablet, a laptop computer, a desktop computer, a smartphone, a smartwatch, smart eyewear, a humidity sensor, and a module for one or more of the same.

In one example, the device 410 is configured generate a potential difference in the presence of water (e.g. from the surrounding environment) for use in powering the other components to enable their functionality. In this respect, the other components may be considered to be the external circuit referred to previously. In another example, the device 410 is configured to generate a potential difference in the presence of water for use in detecting or quantifying the water. In this example, the apparatus 401 may comprise a voltmeter or the like (not shown) for measuring the potential difference of the device 410 to enable detection/quantification of the water.

The electronic display 413 is configured to display content stored on the apparatus 401 (e.g. stored on the storage medium 412), and the transceiver 414 is configured to transmit and/or receive data to/from one or more other devices via a wired or wireless connection. Where the device 410 is configured to detect or quantify the water in the surrounding environment, the electronic display 413 may be used to indicate whether or not there is any water present, and if so, how much. Where the device 410 is configured to power the other components of the apparatus 401, the electronic display 413 may be used to indicate the amount of charge remaining on the device 410.

The processor 411 is configured for general operation of the apparatus 401 by providing signalling to, and receiving signalling from, the other components to manage their operation. The storage medium 412 is configured to store computer code configured to perform, control or enable operation of the apparatus 401. The storage medium 412 may also be configured to store settings for the other components. The processor 411 may access the storage medium 412 to retrieve the component settings in order to manage the operation of the other components. In some embodiments, the storage medium 412 may be configured to store calibration data based on previous humidity measurements (e.g. humidity vs voltage) to enable the presence and/or amount of water to be determined. In this scenario, the processor 411 may be configured to measure the voltage of the device 410 and compare this against the stored calibration data to determine the humidity of the surrounding environment. The processor 411 may also be configured to send this information to the electronic display 413 for presentation to a user of the apparatus 401.

The processor 411 may be a microprocessor, including an Application Specific Integrated Circuit (ASIC). The storage medium 412 may be a temporary storage medium such as a volatile random access memory. On the other hand, the storage medium 412 may be a permanent storage medium such as a hard disk drive, a flash memory, or a non-volatile random access memory.

Figure 5:
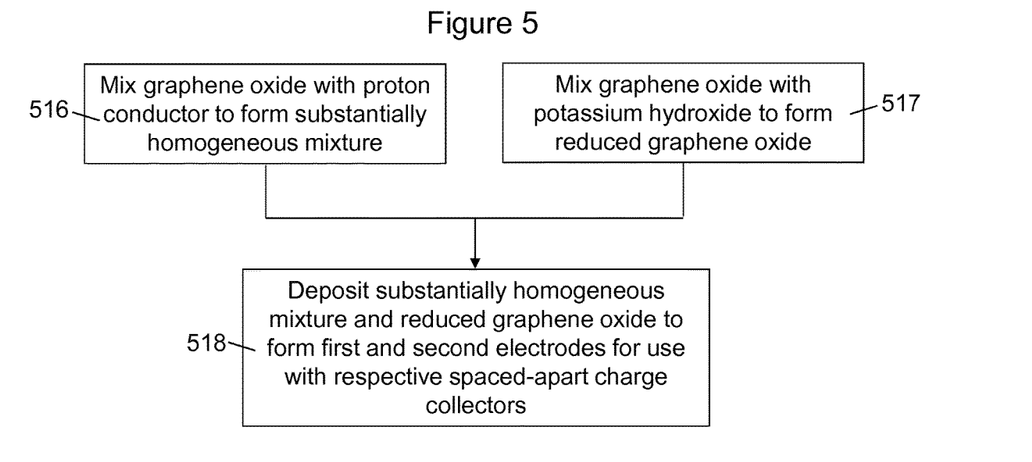
FIG. 5 illustrates schematically a general method of producing the present apparatus.

FIG. 5 shows the main steps 516-518 of a method of making the apparatus described herein. The method generally comprises: mixing graphene oxide with a proton conductor to form a substantially homogeneous mixture 516; mixing graphene oxide with potassium hydroxide to form reduced graphene oxide 517; and depositing the substantially homogeneous mixture and reduced graphene oxide to form first and second electrodes for use with respective spaced-apart charge collectors 518. The steps 516 and 517 can be performed in any appropriate order, including in parallel (as shown).

As mentioned previously, mixing graphene oxide with a proton conductor to form a substantially homogeneous mixture 516 may comprise mixing an aqueous solution of graphene oxide with the proton conductor, e.g. at a ratio of 1:9, 1:4, 3:7, 2:3, 1:1, 3:2, 7:3, 4:1 or 9:1. Alternatively, solid flakes of graphene oxide may be mixed into the proton conductor, which will typically be in the form of a liquid or gel. In addition, mixing graphene oxide with potassium hydroxide to form reduced graphene oxide 517 may comprise mixing an aqueous solution of graphene oxide with an aqueous solution of potassium hydroxide, e.g. at a ratio of 1:9, 1:4, 3:7, 2:3, 1:1, 3:2, 7:3, 4:1 or 9:1. Alternatively, solid flakes of graphene oxide may be mixed into an aqueous solution of potassium hydroxide, or solid particles of potassium hydroxide may be mixed into an aqueous solution of graphene oxide.

The method may further comprise curing the first and second electrode materials after deposition in order to set the electrode materials in position. A curing step would typically be required when the deposited electrode materials comprise one or more solvents, such as water. The method may also comprise depositing an electrolyte such that it is in contact with the graphene oxide-reduced graphene oxide junction.

Deposition 518 of the various materials described herein may be performed using a variety of different fabrication techniques. For example, the electrode materials and electrolyte may be deposited using spray coating, drop casting, spin coating or inkjet printing; and the electrically conducting material used to form the charge collectors may be deposited lithographically using inkjet, screen, stencil or flexographic printing, evaporation or sputtering. The deposition steps 518 may be performed on top of a substrate, such as a paper or polymer substrate.

Figure 6:
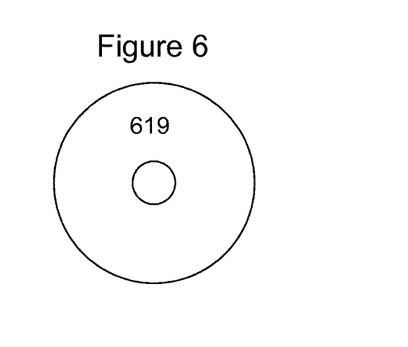
FIG. 6 illustrates schematically a computer-readable medium comprising a computer program configured to perform, control or enable one or more of the method steps of FIG. 5.

FIG. 6 illustrates schematically a computer/processor readable medium 619 providing a computer program according to one embodiment. The computer program may comprise computer code configured to perform, control or enable one or more of the method steps 516-518 of FIG. 5. In this example, the computer/processor readable medium 619 is a disc such as a digital versatile disc (DVD) or a compact disc (CD). In other embodiments, the computer/processor readable medium 619 may be any medium that has been programmed in such a way as to carry out an inventive function. The computer/processor readable medium 619 may be a removable memory device such as a memory stick or memory card (SD, mini SD, micro SD or nano SD).

Other embodiments depicted in the figures have been provided with reference numerals that correspond to similar features of earlier described embodiments. For example, feature number 1 can also correspond to numbers 101, 201, 301 etc. These numbered features may appear in the figures but may not have been directly referred to within the description of these particular embodiments. These have still been provided in the figures to aid understanding of the further embodiments, particularly in relation to the features of similar earlier described embodiments.

It will be appreciated to the skilled reader that any mentioned apparatus/device and/or other features of particular mentioned apparatus/device may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

It will be appreciated that the term "signalling" may refer to one or more signals transmitted as a series of transmitted and/or received signals. The series of signals may comprise one, two, three, four or even more individual signal components or distinct signals to make up said signalling. Some or all of these individual signals may be transmitted/received simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features as applied to different embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
a first electrode comprising a substantially homogeneous mixture of graphene oxide and a proton conductor;
a second electrode comprising reduced graphene oxide; and
spaced-apart charge collectors for the respective first and second electrodes, wherein the first and second electrodes extend from their respective charge collectors towards one another to form a junction at an interface therebetween, and
wherein the substantially homogeneous mixture of the first electrode is configured to be sufficiently hydrophobic to prevent intermixing of the homogeneous mixture with the reduced graphene oxide of the second electrode in proximity to one or both of the respective charge collectors to prevent short circuiting of the spaced-apart charge collectors.

2. The apparatus of claim 1, wherein the substantially homogeneous mixture comprises a substantially uniform distribution of graphene oxide and proton conductor throughout the volume of the mixture.

3. The apparatus of claim 1, wherein the substantially homogeneous mixture comprises a ratio of graphene oxide to proton conductor of 1:9, 1:4, 3:7, 2:3, 1:1, 3:2, 7:3, 4:1 or 9:1.

4. The apparatus of claim 1, wherein the substantially homogeneous mixture comprises a solution.

5. The apparatus of claim 1, wherein the substantially homogeneous mixture comprises a suspension.

6. The apparatus of claim 1, wherein the substantially homogeneous mixture comprises a colloid.

7. The apparatus of claim 1, wherein the substantially homogeneous mixture comprises a dispersion.

8. The apparatus of claim 1, wherein the proton conductor comprises an organic polymer.

9. The apparatus of claim 1, wherein the proton conductor comprises an ionomer.

10. The apparatus of claim 1, wherein the proton conductor comprises Nafion™.

11. The apparatus of claim 1, wherein the apparatus is configured to generate protons at the junction between the first and second electrodes in the presence of water, and wherein the apparatus comprises an electrolyte configured to facilitate the flow of generated protons between the first and second electrodes.

12. The apparatus of claim 11, wherein the electrolyte is configured to absorb water from the surrounding environment and deliver it to the junction to facilitate the generation of protons.

13. The apparatus of claim 11, wherein the apparatus comprises a paper substrate configured to support the first electrode, second electrode and respective charge collectors, and wherein the electrolyte is soaked into the paper substrate.

14. The apparatus of claim 1, wherein the respective charge collectors are spaced apart by a distance of less than one or more of 2 mm, 1 mm, 500 µm, 100 µm and 50 µm.

15. The apparatus of claim 1, wherein the width of the junction between the first and second electrodes is less than one or more of 500 µm, 100 µm, 50 µm, 10 µm and 1 µm.

16. The apparatus of claim 1, wherein the apparatus is one or more of an electronic device, a portable electronic device, a portable telecommunications device, a mobile phone, a tablet, a phablet, a personal digital assistant, a laptop computer, a desktop computer, a smartphone, a smartwatch, smart eyewear, a proton battery, a humidity sensor, and a module for one or more of the same.

17. A substantially homogeneous mixture of graphene oxide and a proton conductor for use as a first electrode of an apparatus,
the apparatus comprising
the first electrode,
a second electrode comprising reduced graphene oxide; and spaced apart charge collectors for the respective first and second electrodes,
wherein the first and second electrodes extend from their respective charge collectors towards one another to form a junction at an interface therebetween, and
wherein the substantially homogeneous mixture of the first electrode is configured to be sufficiently hydrophobic to prevent intermixing of the homogeneous mixture with the reduced graphene oxide of the second electrode in proximity to one or both of the respective charge collectors to prevent short circuiting of the spaced apart charge collectors.

18. A method comprising:
mixing graphene oxide with a proton conductor to form a substantially homogeneous mixture for use as a first electrode of an apparatus,
the apparatus comprising
the first electrode,
a second electrode comprising reduced graphene oxide; and spaced apart charge collectors for the respective first and second electrodes,
wherein the first and second electrodes extend from their respective charge collectors towards one another to form a junction at an interface therebetween, and
wherein the substantially homogeneous mixture of the first electrode is configured to be sufficiently hydrophobic to prevent intermixing of the homogeneous mixture with the reduced graphene oxide of the second electrode in proximity to one or both of the respective charge collectors to prevent short circuiting of the spaced apart charge collectors.

19. A method comprising:
depositing first and second electrodes for use with respective spaced-apart charge collectors, the first electrode comprising a substantially homogeneous mixture of graphene oxide and a proton conductor, the second electrode comprising reduced graphene oxide, wherein the first and second electrodes are deposited to extend from their respective charge collectors towards one another to form a junction at an interface therebetween, and wherein the substantially homogeneous mixture of the first electrode is configured to be sufficiently hydrophobic to prevent intermixing of the homogeneous mixture with the reduced graphene oxide of the second electrode in proximity to one or both of the respective charge collectors to prevent short circuiting of the spaced-apart charge collectors.

20. A computer program comprising computer code configured to perform the method of claim 18.

* * * * *